(12) United States Patent
Ha et al.

(10) Patent No.: US 10,891,795 B2
(45) Date of Patent: Jan. 12, 2021

(54) LOCALIZATION METHOD AND APPARATUS BASED ON 3D COLOR MAP

(71) Applicant: SAMSUNG ELECTRONICS CO., LTD., Suwon-si (KR)

(72) Inventors: Inwoo Ha, Seongnam-si (KR); Nahyup Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/508,513

(22) Filed: Jul. 11, 2019

(65) Prior Publication Data

US 2020/0184727 A1 Jun. 11, 2020

(30) Foreign Application Priority Data

Dec. 11, 2018 (KR) .......................... 10-2018-0158855

(51) Int. Cl.
| | |
|---|---|
| *G06T 19/00* | (2011.01) |
| *G06T 7/73* | (2017.01) |
| *G06T 15/10* | (2011.01) |
| *G01C 21/20* | (2006.01) |

(52) U.S. Cl.
CPC .............. *G06T 19/006* (2013.01); *G06T 7/74* (2017.01); *G06T 15/10* (2013.01); *G01C 21/206* (2013.01); *G06T 2207/10024* (2013.01); *G06T 2207/10028* (2013.01); *G06T 2215/16* (2013.01)

(58) Field of Classification Search
None
See application file for complete search history.

(56) References Cited

U.S. PATENT DOCUMENTS

| | | | |
|---|---|---|---|
| 7,292,257 B2 * | 11/2007 | Kang | G06T 15/205 345/419 |
| 9,989,967 B2 | 6/2018 | Jacobus et al. | |
| 2014/0300743 A1 * | 10/2014 | Kumon | G06T 11/00 348/148 |
| 2017/0270361 A1 * | 9/2017 | Puttagunta | G06K 9/00791 |
| 2018/0181135 A1 | 6/2018 | Urano | |
| 2018/0181138 A1 | 6/2018 | Hashimoto et al. | |
| 2020/0167941 A1 * | 5/2020 | Tong | G06K 9/6289 |

FOREIGN PATENT DOCUMENTS

| | | |
|---|---|---|
| KR | 10-1826364 B1 | 2/2018 |
| KR | 10-2018-0050823 A | 5/2018 |

OTHER PUBLICATIONS

Fuentes-Pacheco, J., et al., "Visual simultaneous localization and mapping: a survey", *Artifical Intelligence Review*, Nov. 2015, pp. 1-28.

* cited by examiner

*Primary Examiner* — Robert J Craddock
(74) *Attorney, Agent, or Firm* — NSIP Law

(57) ABSTRACT

A localization method and apparatus are provided. The method comprises generating a synthetic image corresponding to a current time period based on a three-dimensional (3D) color map corresponding to an image captured at a time period prior to the current time period, and position information at the current time period time, and determining final position information at the current time period based on the synthetic image corresponding to the current time period and an image captured at the current time period.

23 Claims, 10 Drawing Sheets

LOCALIZATION METHOD AND APPARATUS BASED ON 3D COLOR MAP

CROSS-REFERENCE TO RELATED APPLICATIONS

This application claims the benefit under 35 USC § 119 (a) of Korean Patent Application No. 10-2018-0158855 filed on Dec. 11, 2018 in the Korean Intellectual Property Office, the entire disclosure of which is incorporated herein by reference for all purposes.

BACKGROUND

1. Field

The following description relates to a localization method and apparatus based on a three-dimensional (3D) color map.

2. Description of Related Art

Various types of augmented reality (AR) services are provided in various fields, for example, fields related to driving assistance for vehicles and other transportation devices, games, and various amusement applications. Various localization methods may be used to further realistically provide AR. For example, a localization method which establishes a relative pose by extracting feature points in a two-dimensional (2D) image, and by discovering a corresponding relationship through matching between the feature points may be implemented. Such technology for estimating a relative pose in a three-dimensional (3D) space through comparison between 2D images has some constraints with regard to accuracy, and may not readily find an absolute position in an actual map. Additionally, although 3D geometry information of a background image and texture information corresponding thereto may be necessary for natural rendering of AR, a map or a high density (HD) map may not include texture information and/or actual color information.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a localization method includes generating a synthetic image corresponding to a current time period based on a three-dimensional (3D) color map corresponding to an image captured at a time period prior to the current time period, and position information at the current time period, and determining final position information at the current time period based on the synthetic image corresponding to the current time period and an image captured at the current time period.

The generating of the synthetic image may include generating the synthetic image by projecting the 3D color map corresponding to the image at the prior time period onto a 3D semantic map based on the position information at the current time period.

The determining of the final position may include calculating relative pose information based on the synthetic image corresponding to the current time period and the image captured at the current time period, and determining the final position information at the current time period based on the relative pose information.

The calculating of the relative pose position may include matching the synthetic image corresponding to the current time period and the image captured at the current time period, comparing first pose information in the synthetic image corresponding to the current time period to second pose information in the image captured at the current time period, and calculating the relative pose information based on a comparison result.

The comparing of the first pose information may include at least one of comparing a color of the synthetic image corresponding to the current time period to a color of the image captured at the current time period, comparing semantic information of the synthetic image corresponding to the current time period to semantic information of the image captured at the current time period, and comparing depth information of the synthetic image corresponding to the current time period to depth information of the image captured at the current time period.

The determining of the final position information may include determining the final position information at the current time period by modifying the position information at the current time period based on the relative pose information.

The localization method may further include generating a 3D color map corresponding to the image captured at the current time period based on the image at the current time period, the final position information at the current time period, and a 3D geometry acquired from a 3D semantic map.

The generating of the 3D color map may include generating the 3D color map corresponding to the image captured at the current time period such that a color difference between the image captured at the current time period and the synthetic image corresponding to the current time period is within a desired standard based on the final position information at the current time period.

The generating of the 3D color map may include generating a projected image by projecting the 3D semantic map onto a projection surface corresponding to the final position information at the current time period, coloring the projected image based on the image captured at the current time period, and generating the 3D color map corresponding to the image captured at the current time period by inversely projecting the colored projected image onto the 3D semantic map.

The generating of the projected image may include extracting a partial region of the 3D semantic map based on a parameter of a camera that captures the image at the current time period, and projecting the partial region onto the projection surface.

The coloring of the projected image may include determining a color of pixels included in the projected image based on a mapping relationship between the projected image and the image captured at the current time period.

The pixels may correspond to surface points corresponding to a surface of a road.

The localization method may further include rendering a virtual object at the current time period with the 3D color map corresponding to the image captured at the current time period.

The rendering of the virtual object may include acquiring a background color displayed on a transparent display based on the 3D color map corresponding to the image captured at the current time period, and rendering the virtual object based on a color of the virtual object and the background color.

The rendering of the virtual object may include rendering a shadow component of the virtual object and an inter-reflected component by the virtual object with the 3D color map corresponding to the image captured at the current time period.

In a general aspect, a localization apparatus includes one or more sensors configured to capture an image at a first time period and position information at a second time period, and a processor configured to generate a synthetic image corresponding to the second time period based on a three-dimensional (3D) color map corresponding to the image captured at the first time period and the position information at the second time period, and determine final position information at the second time period based on the synthetic image corresponding to the second time period and the image at the second time period.

The processor may be configured to generate the synthetic image by projecting the 3D color map corresponding to the image captured at the first time period onto a 3D semantic map based on the position information at the second time period.

The processor may be configured to calculate relative pose information based on the synthetic image corresponding to the second time period and the image captured at the second time period, and to determine the final position information at the second time period based on the relative pose information.

The processor may be configured to generate a 3D color map corresponding to the image captured at the second time period based on the image captured at the second time period, the final position information at the second time period, and a 3D geometry acquired from a 3D semantic map.

The processor may be configured to generate a projected image by projecting the 3D semantic map onto a projection surface corresponding to the final position information at the second time period, to color the projected image based on the image at the second time period, and to generate the 3D color map corresponding to the image at the second time period by inversely projecting the colored projected image onto the 3D semantic map.

In a general aspect, a localization method includes receiving a current image frame and position information related to the current image frame, generating a synthetic image corresponding to the current image frame based on the position information and a three-dimensional (3D) color map corresponding to a previous image frame, and determining a final position of a current image of the current image frame based on a pose difference between the synthetic image and the current image.

The synthetic image may be generated by projecting the 3D color map onto a 3D semantic map.

The pose difference may correspond to a difference between first pose information in the synthetic image corresponding to the current image frame, and second pose information in the current image frame.

Other features and aspects will be apparent from the following detailed description, the drawings, and the claims.

Figure 1:
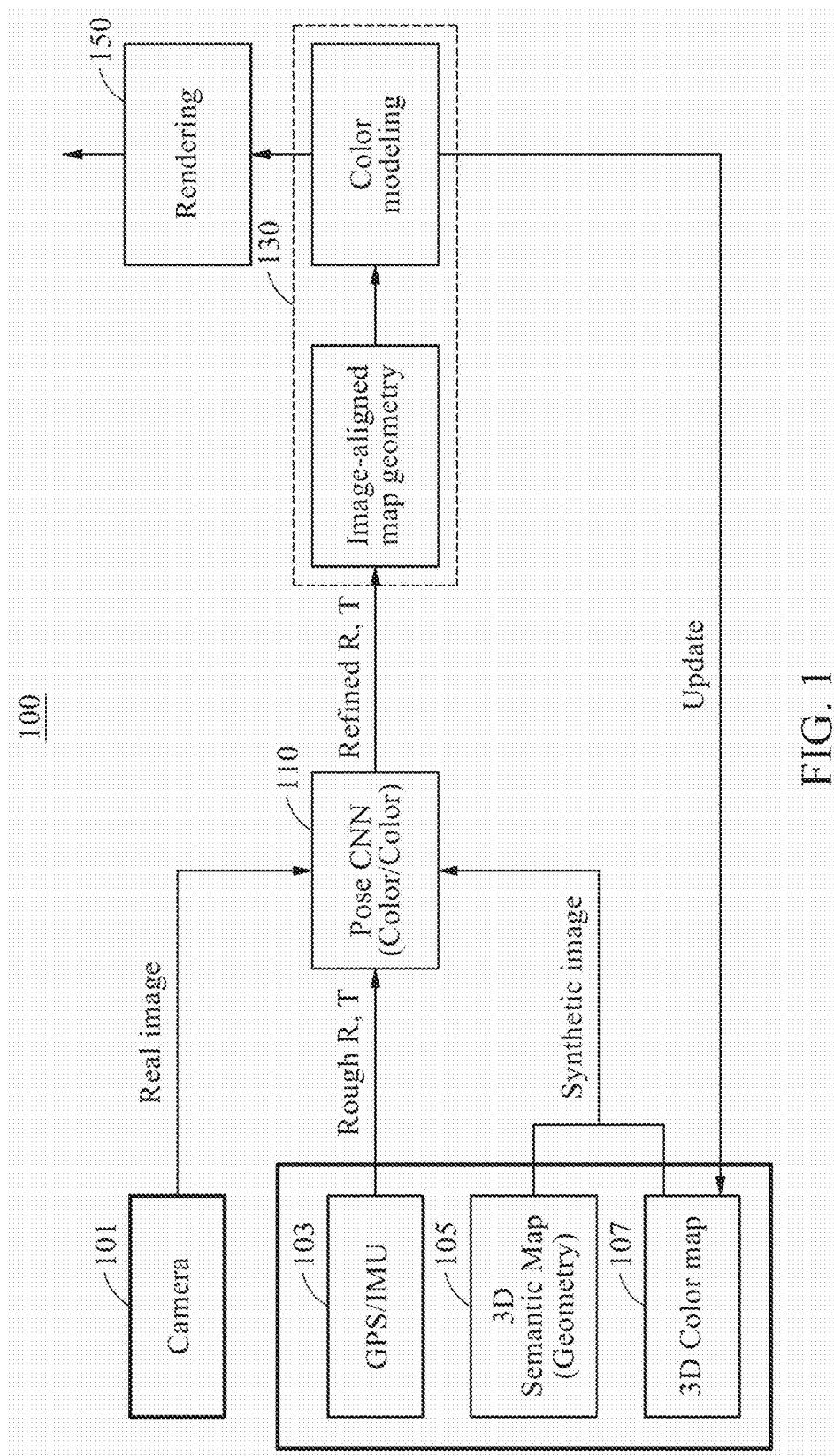
FIG. 1 illustrates an example of a localization method in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for the purpose of describing particular examples only, and is not intended to limit the disclosure or claims. The singular forms "a," "an," and "the" include the plural forms as well, unless the context clearly indicates otherwise. The terms "comprises," "comprising," "includes," and "including" specify the presence of stated features, numbers, operations, elements, components, or combinations thereof, but do not preclude the presence or addition of one or more other features, numbers, operations, elements, components, or combinations thereof.

Unless otherwise defined, all terms used herein, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Hereinafter, the examples are described with reference to the accompanying drawings. Like reference numerals used herein may refer to like elements throughout.

FIG. 1 illustrates an example of a localization method. FIG. 1 illustrates a localization process 110 of a localization apparatus and a color modeling process 130. The localization apparatus may perform a rendering process 150 with a three-dimensional (3D) color map 107 corresponding to a real image based on a result of the color modeling process 130. The localization apparatus may be an apparatus that performs the localization process 110, the color modeling process 130, and the rendering process 150. However, this is only an example, and the localization apparatus may perform other processes. The localization apparatus may be, for example, a manned vehicle, semi and fully autonomous self-driving vehicles, robotic vehicles, and may be a user device, for example, a navigational device and a smartphone, but is not limited thereto.

As used herein, "localization" may be referred to as the process of determining the location, and optionally, the orientation (collectively referred to as the "pose") of an object relative to a map.

The localization process 110 corresponds to a process of determining precise position information, for example, final position information, corresponding to a real image captured through a camera 101. For example, in an environment in which a 3D semantic map 105 is given, the localization process 110 may be performed based on the real image captured through the camera 101, a synthetic image generated by the localization apparatus, and position information sensed by a global positioning system/inertial measurement unit (GPS/IMU) sensor 103. For example, the position information sensed by the GPS/IMU sensor 103 may be referred to as rough position information (Rough R, T) based on a GPS sensing signal with an error of about 10M. As used herein, "position" and "location" may be used interchangeably.

The localization process 110 may be performed through a color comparison between the synthetic image and the real image in, for example, a pose convolutional neural network (CNN).

In one example, final position information (Refined R, T) may be determined by acquiring rough position information (Rough R, T) through localization using the GPS/IMU sensor 103 and by correcting an error present in the rough position information based on the real image captured through the camera 101. Herein, the rough position information represents position information having a relatively low precision.

In an example, the real image may be, for example, a driving image that is captured using a capturing device mounted to a vehicle. The image capture device may be the camera 101. The driving image may include one or more driving images corresponding to the respective points in times. The driving image may include a plurality of frames. In an example, the image capture device may be fastened at a desired position, for example, a windshield, a dashboard, and a rear-view mirror of the vehicle, and may capture a driving image ahead of the vehicle. However, this is only an example. The image capture device may capture images that are located to the sides and the rear of the vehicle. The image capture device may include, for example, a vision sensor, an image sensor, and a device that performs a function similar thereto. The image capture device may capture a mono image or may capture a frame-by-frame image depending on the examples. Alternatively, the real image may be an image that is captured from another apparatus apart from the localization apparatus. The real image may be used as a background image or other images displayed with a virtual object for an augmented reality (AR) service.

The synthetic image may be generated based on position information sensed by the GPS/IMU sensor 103, the three-dimensional (3D) semantic map 105, and the 3D color map 107. The 3D semantic map 105 may include 3D point clouds as a map that includes 3D information on each class, for example, a road, a lane boundary, and the like. The 3D color map 107 may be understood as a color map that is mapped or aligned with 3D geometry. The 3D color map 107 may include semantic information and/or depth information as well as color information. The 3D color map 107 may correspond to an image captured at a previous point in time, for example, an image at a first point in time, compared to a point in time of the real image captured through the camera 101. In an example, position information sensed by the GPS/IMU sensor 103 may be, for example, position information at a second point in time, of the point in time at which the real image is captured through the camera 101. The position information may include rotation (R) information and transition (T) information. The transition information may correspond to 3D coordinates (x, y, z). Also, the rotation information may correspond to pitch, yaw, and roll. The position information may be sensed using various sensors, for example, a gyro sensor, an accelerometer sensor, light detecting and ranging (LIDAR) systems, radio detection and ranging (RADAR), sound navigation and ranging (SONAR) systems, visual odometry systems, in addition to the GPS/IMU sensor 103. Hereinafter, the second point in time may be understood as a current point in time and the first point in time may be understood as the previous point in time in relation to the second point in time.

All of the textures of a road included in a color image, for example, a shadow, a stain, and road demarcation lines, may be examples of features of the color image. Also, although 3D coordinates and class distinctions, such as a dotted line interval of a line, a crosswalk, and a stop line, may be marked on the 3D semantic map 105, a shape and a shadow may also appear in the color image. Accordingly, position information may be modified through comparison between objects included in color images captured at the respective points in times.

Hereinafter, the localization process 110 will be further described with reference to FIGS. 2 to 6. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

The color modeling process 130 corresponds to a process of generating a 3D color map corresponding to a real image at a current point in time. In the color modeling process 130, the localization apparatus may generate the 3D color map 107 corresponding to the image at the second point in time that is captured through the camera 101 at each respective point in time, based on the geometry of the 3D semantic map 105 and the final position information at the second point in time. The localization apparatus may reconfigure a color of the 3D color map 107 corresponding to the image at the second point in time based on the 3D color map 105 corresponding to the image at the first point in time, the 3D semantic map, and the image at the second point in time. The color modeling process 130 will be further described with reference to FIGS. 7 to 8.

In the rendering process 150, the localization apparatus may render a virtual object, for example, an indicator for guiding a route, a virtual vehicle, and a road, based on final position information at the second point in time determined through the localization process 110 and the 3D color map 107 corresponding to the image at the second point in time generated through the color modeling process 130. The localization apparatus may provide an AR service by displaying the rendered virtual object on, for example, a head-up display (HUD) of a vehicle or a display of a navigation.

The term "vehicle" used herein may refer to a vehicle that drives on a road. For example, the vehicle may include an autonomous driving vehicle and a smart vehicle that includes an advanced driver assistance system (ADAS). However, the "vehicle" is not so limited, and may refer to other vehicles such as sub-sea robotic vehicles, for example. The term "road" may refer to a surface on which vehicles are travelling. For example, the road may include various types of roads, such as a highway, a national road, a local road, a high-speed national road, and a road for the exclusive use of motor vehicles. The road may include one or more lanes. The term "lane" refers to a space on a road that is distinguished through lines marked on the road surface. The lane may be identified based on left and right lines or lane boundary lines adjacent to the corresponding lane. Also, the term "line" may be understood as various types of lines, for example, a solid line, a dotted line, a curved line, and a zigzagged line, which are marked in white, blue, yellow, or any other color on the road surface. The line may correspond to a line on one side of the road that distinguishes a single lane and may also be a pair of lines, that is a left lane and a right lane corresponding to a lane boundary line that distinguishes a single lane.

The following examples may be applied for an AR navigation system, such as a smart vehicle, to guide a route, to generate visual information used to assist in the steering of an autonomous driving vehicle, or to provide a variety of control information to assist in the driving of a vehicle. The examples may be applied to provide visual information to a device that includes a smart system, such as a head-up display (HUD) for driving assistance or complete autonomous driving of a vehicle and to achieve a safe and pleasant driving experience. The examples may be applied to, for example, an autonomous driving vehicle, a smart vehicle, a smartphone, and a mobile device.

Figure 2:
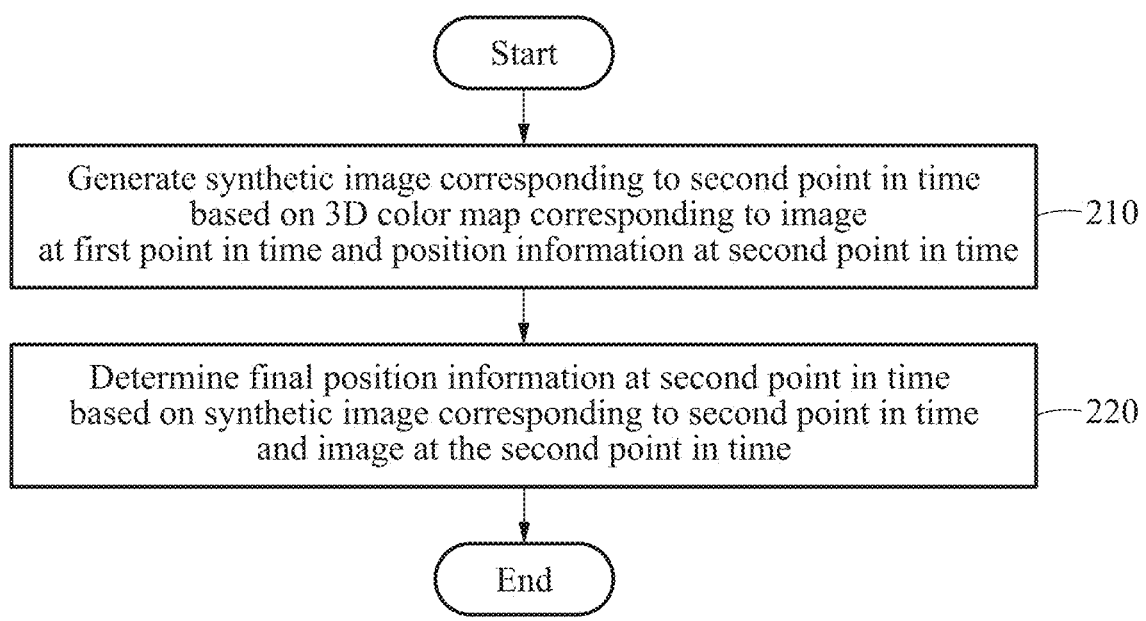
FIG. 2 is a flowchart illustrating an example of a localization method in accordance with one or more embodiments.

FIG. 2 is a flowchart illustrating an example of a localization method. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. One or more blocks of FIG. 2, and combinations of the blocks, can be implemented by special purpose hardware-based computer that perform the specified functions, or combinations of special purpose hardware and computer instructions. In addition to the description of FIG. 2 below, the descriptions of FIG. 1 are also applicable to FIG. 2, and are incorporated herein by reference. Thus, the above description may not be repeated here.

Referring to FIG. 2, in operation 210, a localization apparatus generates a synthetic image corresponding to a second point in time (a current point in time) based on a 3D color map corresponding to an image at a first point in time (a previous point in time relative to the current point in time), and position information at the second point in time. In an example, the 3D color map corresponding to the image at the first point in time may be generated at the first point in time based on the image at the first point in time, position information at the first point in time, and a geometry acquired from a 3D semantic map. Position information at the second point in time may be sensed using, for example, an IMU sensor, a GPS sensor, a LIDAR and a RADAR. The position information at the second point in time may correspond to rough position information with an error of about 10M by the GPS sensor.

Hereinafter, the image at the first point in time may be referred to as a previous frame image and an image at the second point in time may also be referred to as a current frame image.

In operation 210, the localization apparatus generates the synthetic image corresponding to the second point in time by projecting the 3D color map corresponding to the image at the first point in time onto the 3D semantic map, particularly, a 3D geometry acquired from the 3D semantic map, based on the position information at the second point in time. The synthetic image corresponding to the second point in time may be a color image.

In one example, the synthetic image corresponding to the second point in time may be generated due to the following reasons. For example, the position information may be in a form of a vector of a direction and a position sensed by a GPS sensor and/or IMU sensor, and a real image, for example, the image at the second point in time, captured through a camera may have a color. In an example, a simple comparison between the vector of the direction and the position and the color may be impossible. Therefore, the synthetic image may be generated based on the position information, and a final position information of the real image may be determined based on a pose difference between the synthetic image and the real image.

In operation 220, the localization apparatus determines the final position information at the second point in time based on the synthetic image corresponding to the second point in time and the real image at the second point in time. For example, the localization apparatus may calculate relative pose information based on the synthetic image corresponding to the second point in time and the real image at the second point in time. For example, the localization apparatus may match the synthetic image corresponding to the second point in time and the real image at the second point in time. The localization apparatus may compare first pose information in the synthetic image corresponding to the second point in time to second pose information in the real image at the second point in time. The localization apparatus may calculate the relative pose information based on a comparison result. The localization apparatus may determine the final position information at the second point in time based on the relative pose information.

For example, in an example of comparing the first pose information to the second pose information, the localization apparatus may compare a color of the synthetic image corresponding to the second point in time and a color of the real image at the second point in time. The localization apparatus may verify a pose difference between the synthetic image and the real image by comparing the color of the synthetic image and a color, for example, an RGB value, of the real image, for example, the real image at the second point in time. Alternatively, the localization apparatus may compare semantic information of the synthetic image corresponding to the second point in time to semantic information of the real image at the second point in time. Additionally, the localization apparatus may compare depth information of the synthetic image corresponding to the second point in time to depth information of the real image at the second point in time. The localization apparatus may calculate the relative pose information based on a color comparison result, a semantic information comparison result, and/or a depth information comparison result.

In operation 220, the localization apparatus may determine the final position information at the second point in time by modifying the position information at the second point in time based on the relative pose information.

Figure 3:
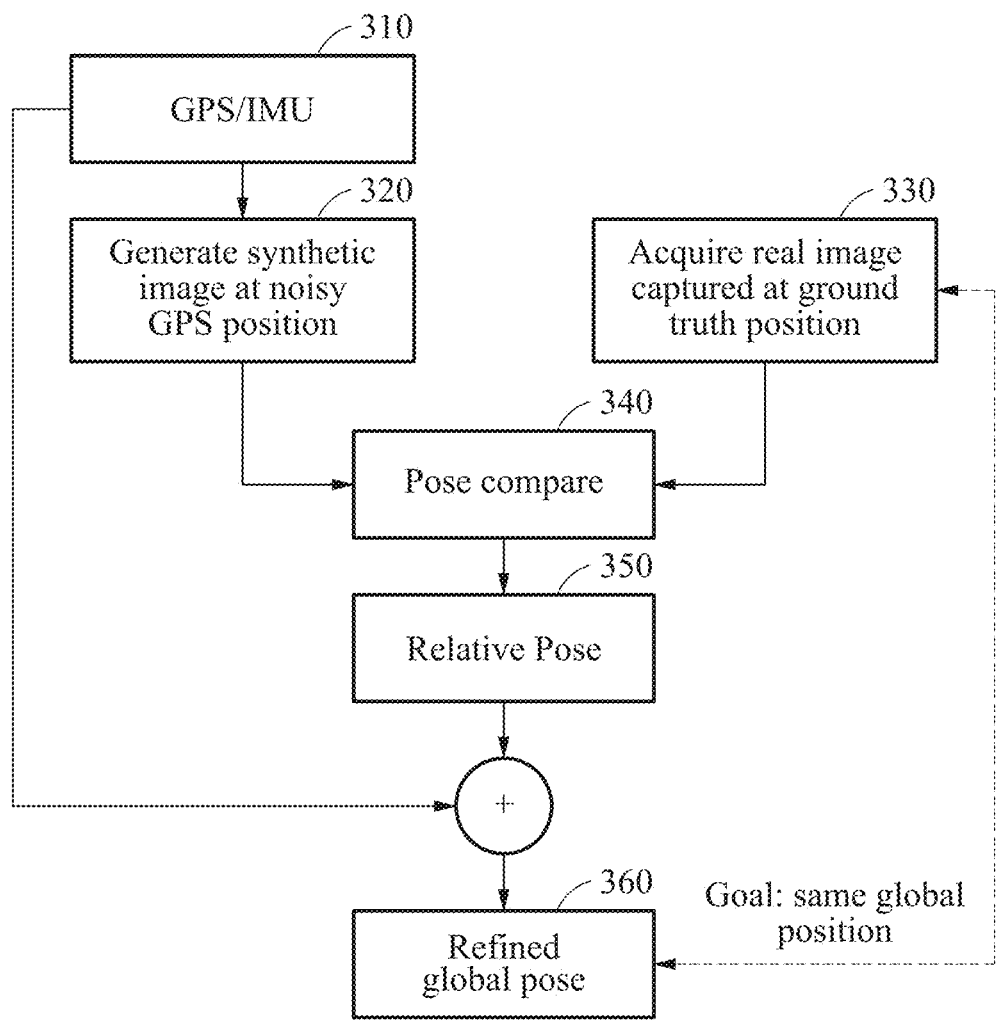
FIGS. 3 to 5 illustrate examples of a method of determining final position information in accordance with one or more embodiments.

FIG. 3 illustrates an example of a method of determining, by a pose CNN, final position information. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. One or more blocks of FIG. 3, and combinations of the blocks, can be implemented by special purpose hardware-based computer that perform the specified functions, or combinations of special purpose hardware and computer instructions. In addition to the description of FIG. 3 below, the descriptions of FIGS. 1-2 are also applicable to FIG. 3, and are incorporated herein by reference. Thus, the above description may not be repeated here.

Referring to FIG. 3, in operation 310, the localization apparatus receives or acquires position information, for example, position information at a second point in time, sensed by a GPS/IMU sensor. In an example, the position information at the second point in time may correspond to, for example, a noisy GPS position having an error of about 10M.

In operation 320, the localization apparatus generates a synthetic image corresponding to the second point in time. Here, the localization apparatus may generate the synthetic image corresponding to the second point in time based on position information at the second point in time corresponding to the noisy GPS position, and a 3D color map corresponding to an image at a first point in time.

In operation 330, the localization apparatus acquires an image at the second point in time captured through a camera. The image at the second point in time may refer to a real image that is captured through the camera at a ground truth position.

In operation 340, the localization apparatus compares pose information between the synthetic image corresponding to the second point in time and the real image at the second point in time. In operation 350, the localization apparatus calculates relative pose information based on a result of the comparison of the pose information between the synthetic image corresponding to the second point in time and the real image at the second point in time. For example, the localization apparatus may calculate relative pose information, that is, a difference in relative pose, such as a displacement level or a transition level between the synthetic image corresponding to the second point in time and the real image at the second point in time through comparison of the pose information.

In operation 360, the localization apparatus determines final position information at the second point in time that is finally refined by modifying the position information at the second point in time that is received in operation 310 based on the difference in relative pose that is calculated in operation 350. In an example, the final position information at the second point in time determined in operation 360 may have the same global position as that of the real image at the second point in time that is acquired in operation 330.

Figure 4:
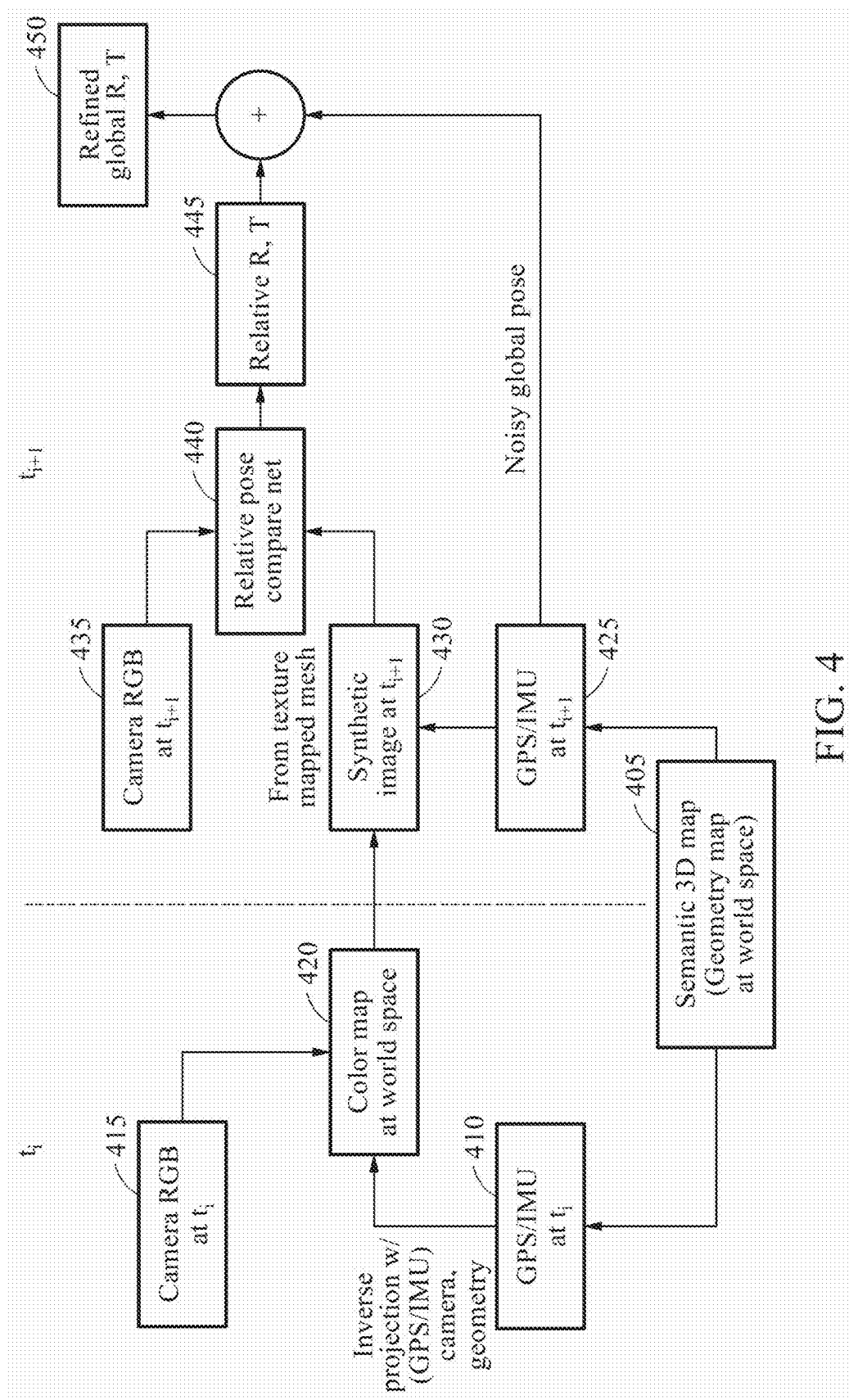

FIG. 4 illustrates an example of a method of determining final position information. Operations of the localization apparatus at a first point in time and a second point in time will be described with reference to FIG. 4. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer that perform the specified functions, or combinations of special purpose hardware and computer instructions. In addition to the description of FIG. 4 below, the descriptions of FIGS. 1-3 are also applicable to FIG. 4, and are incorporated herein by reference. Thus, the above description may not be repeated here.

In FIG. 4, the first point in time is represented as $t_i$ and the second point in time is represented as $t_{i+1}$. In an example, a 3D semantic map 405 corresponds to a geometry map in a world coordinate system. The 3D semantic map 405 may be prestored in a memory of the localization apparatus or may be received from a source external to the localization apparatus. The 3D semantic map 405 may be, for example, an HD map captured from the surroundings using a LIDAR. The HD map corresponds to a 3D map with a high density, for example, density of a centimeter unit, for autonomous driving. The HD map may include line information, for example, a road center line and a road boundary line, and object information associated with, or relative to, the road, for example, a traffic light, a sign board, a road surface marking, and various structures, in a 3D digital form.

For example, only some colors each distinguishing a class of each object, such as a line, a road, and a traffic light, may be displayed on the 3D semantic map 405. That is, in an example, not all the colors may be displayed on the 3D semantic map 405, such as in a color image. Also, information on a class, aside from the line, may be insufficient in the 3D semantic map 405 and the line does not include longitudinal information (cue). If the longitudinal information is absent in the 3D semantic map 405, it may be difficult to verify an HD only with the image. Accordingly, rendering may not be performed using the 3D semantic map 405 alone, and rendering may be performed by coloring, that is, applying a color to the 3D semantic map 405.

The localization apparatus generates a 3D color map 420 corresponding to an image 415 at the first point in time based on the 3D semantic map 405, position information 410 at the first point in time sensed by the GPS sensor/IMU sensor at the first point in time, and the image 415 at the first point in time captured through the camera. A method of generating, by the localization apparatus, a 3D color map is described with reference to FIGS. 7 to 9.

At the second point in time, the localization apparatus generates a synthetic image 430 corresponding to the second point in time, based on the 3D color map 420 corresponding to the image 415 at the first point in time and position information 425 at the second point in time.

The localization apparatus calculates relative pose information (Relative R, T) 445 by applying the synthetic image 430 at the second point in time and an image 435 at the second point in time to a neural network 440. The localization apparatus determines final position information 450 at the second point in time by modifying the position information 425 at the second point in time based on the relative pose information 445. In an example, the final position information 450 at the second point in time corresponds to refined global position information that is refined based on the relative pose information 445.

As described above, the 3D semantic map 405 may not represent all of the colors, which differs from the real image. Accordingly, if the synthetic image 430 corresponding to the second point in time is generated using the 3D semantic map 405, the synthetic image 430 corresponding to the second point in time may not represent colors properly. In an example, relative position information may not be appropriately verified through color comparison between the synthetic image 430 corresponding to the second point in time and the image 435 at the second point in time. Accordingly, the localization apparatus generates the 3D color map corresponding to the image 435 at the second point in time by applying colors of the image 435 at the second point in time to the 3D semantic map 405. The localization apparatus generates the synthetic image 430 corresponding to the second point in time based on the 3D color map corresponding to the image 435 at the second point in time, such that the position information may be modified through color comparison between the synthetic image 430 corresponding to the second point in time and the real image 435 at the second point in time.

Figure 5:
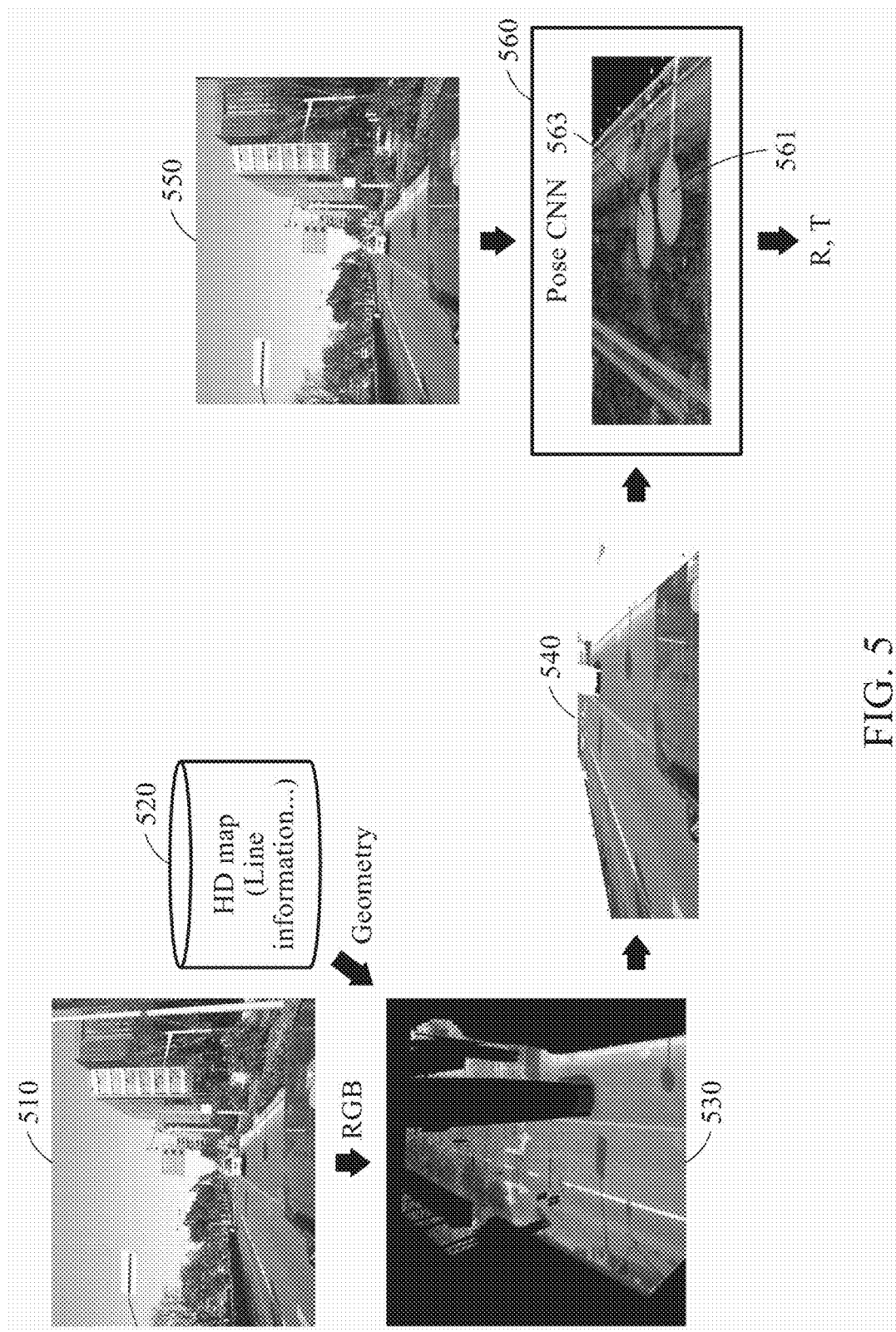

FIG. 5 illustrates an example of a method of determining final position information of a real image through comparison between a synthetic image and the real image. FIG. 5 illustrates a previous frame image 510, an HD map 520, a synthetic image 530, a synthetic image 540 rendered with a current frame, a current frame image 550, and an image 560 on which relative pose information is displayed. The HD map 520 may correspond to a 3D semantic map.

The localization apparatus generates the colored synthetic image 530 by coloring, that is, applying colors of the previous frame image 510 to geometry information acquired from the HD map 520. The localization apparatus renders the synthetic image 530 with the current frame and generates the rendered synthetic image 540. In an example, the localization apparatus may render the synthetic image 530 to be a current frame in which noise is absent, and may also render the synthetic image 530 to be a current frame in which noise is present.

For example, the localization apparatus may determine final position information (R, T) corresponding to the current frame image 550 by comparing the rendered synthetic image 540 and the current frame image 550 through a pose CNN. For example, the localization apparatus may calculate relative pose information, for example, a positional difference between a shadow 561 included in the rendered synthetic image 540 and a shadow 563 included in the current frame image 550. The localization apparatus may determine a global position corresponding to the current frame image 550 by applying the positional difference between the shadow 561 and the shadow 563 to the current frame image 550. Hereinafter, an operation of the pose CNN will be described with reference to FIG. 6.

Figure 6:
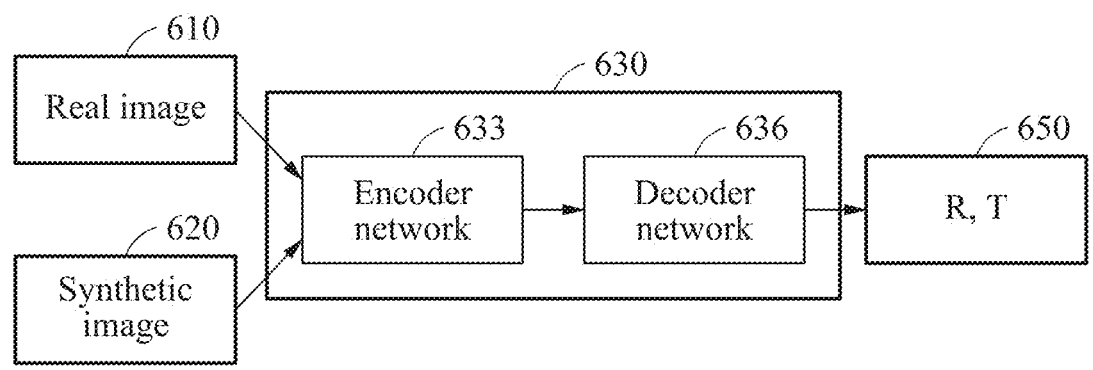
FIG. 6 illustrates an example of an operation of a neural network, for example, a pose convolutional neural network (CNN) in accordance with one or more embodiments.

FIG. 6 illustrates an example of an operation of a neural network, for example, a pose CNN. FIG. 6 illustrates a real image 610, a synthetic image 620, and a neural network 630.

The neural network 630 is pretrained to minimize a pose difference, for example, a loss, between the real image 610 and the synthetic image 620. Here, the real image 610 and the synthetic image 620 may be images corresponding to a current point in time.

The neural network 630 may represent a training model configured as software or hardware using a large number of artificial neurons, for example, nodes, though such reference is not intended to impart any relatedness with respect to how the neural network architecture computationally maps or thereby intuitively recognizes information and how a human's neurons operate, i.e., the term artificial neuron is merely a term of art referring to the hardware implemented nodes of a neural network. The neural network 630 performs operations through the artificial neurons or nodes. The neural network 630 may be provided in various structures, for example, a CNN, a deep neural network (DNN), a recurrent neural network (RNN), and a bidirectional long short term memory (BLSTM) as a non-limiting example. In such an example, the DNN may include one or more of a fully connected networks, a deep convolutional network, a recurrent deep neural network (RDNN), and/or a bidirectional recurrent neural network (BDRNN) may include different or overlapping neural network portions respectively with such full, convolutional, recurrent connections, and/or bidirectional recurrent connections.

The neural networks may be processor implemented neural network models, and various processes may be implemented through the neural network models as specialized computational architectures which, after substantial training, may provide computationally intuitive mappings between input patterns and output patterns or pattern recognitions of input patterns, as non-limiting examples. The trained capability of generating such mappings or performing such example pattern recognitions may be referred to as a learning capability of the neural network. Such trained capabilities may also enable the specialized computational architecture to classify such an input pattern, or portion of the input pattern, as a member that belongs to one or more predetermined groups. Further, because of the specialized training, such specially trained neural network may thereby have a generalization capability of generating a relatively accurate or reliable output with respect to an input pattern that the neural network may not have been trained for, for example.

The neural network 630 receives the real image 610 and the synthetic image 620, and determines final position information (R, T) based on the received real image 610 and synthetic image 620.

The neural network 630 includes an encoder network 633 and a decoder network 636. The encoder network 633 may include, for example, fully connected layers of an input layer, a hidden layer, and an output layer. The decoder network 636 may be, for example, a softmax layer.

Figure 7:
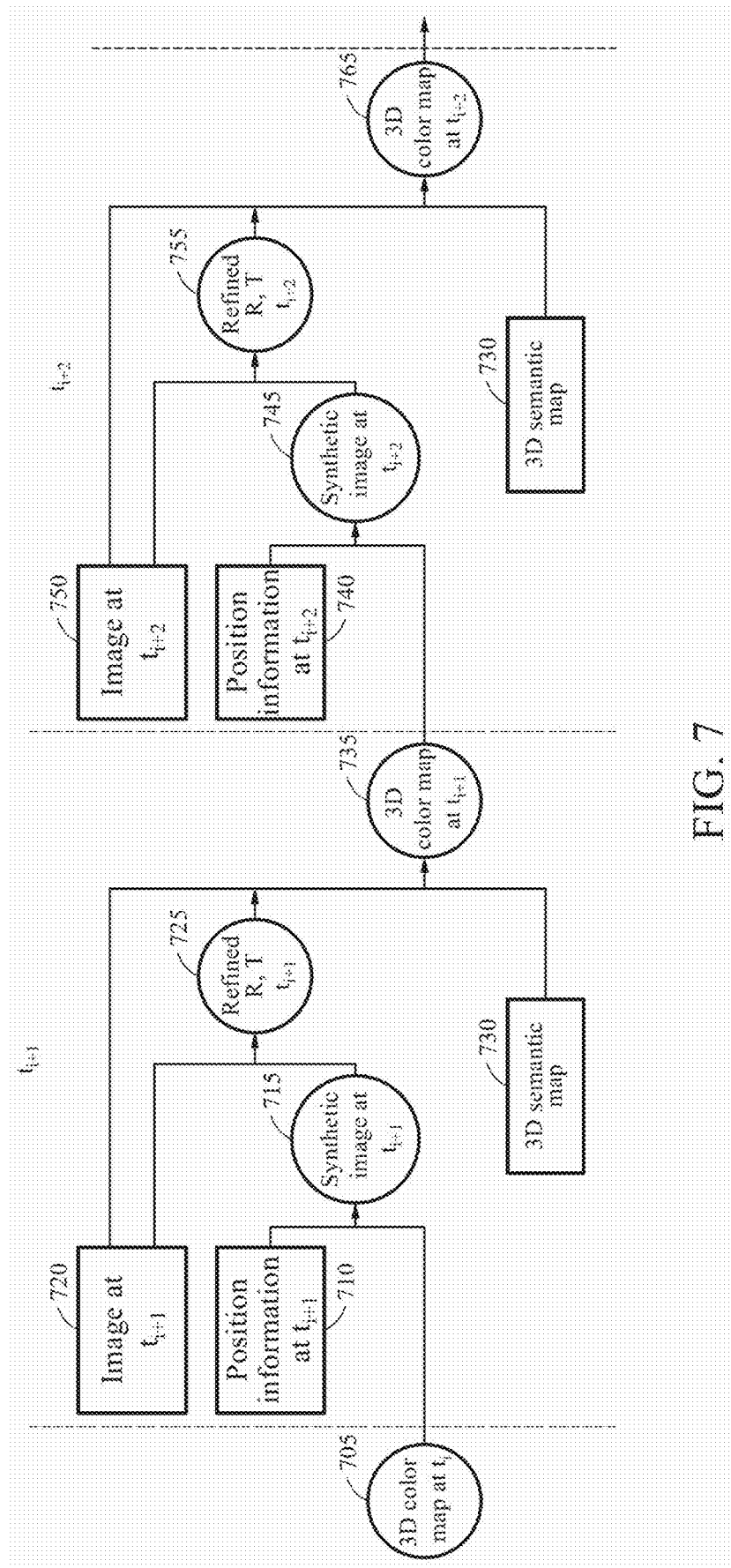
FIG. 7 illustrates an example of a process of generating a three-dimensional (3D) color map corresponding to each point in time in accordance with one or more embodiments.

FIG. 7 illustrates an example of a process of generating a 3D color map corresponding to each point in time. Hereinafter, a process of generating a 3D color map corresponding to images at a first point in time, a second point in time, and a third point in time will be described with reference to FIG. 7. In FIG. 7, the first point in time is represented as $t_i$, the second point in time is represented as $t_{i+1}$, and the third point in time is represented as $t_{i+2}$.

For example, the first point in time refers to an initial localization stage of the localization apparatus. Here, a 3D color map 705 generated at the first point in time may be generated based on an image at the first point in time, position information at the first point in time, and a 3D semantic map 730. The 3D color map 705, generated to correspond to the image at the first point in time, may be used to generate a synthetic image corresponding to the second point in time.

The localization apparatus generates a synthetic image 715 corresponding to the second point in time based on the 3D color map 705 generated to correspond to the image at the first point in time and position information 710 at the second point in time. The localization apparatus determines final position information 725 at the second point in time by comparing relative pose information, for example, a color, between the synthetic image 715 corresponding to the second point in time and an image 720 at the second point in time. The localization apparatus generates a 3D color map 735 corresponding to the image 720 at the second point in time based on the image 720 at the second point in time, the final position information 725 at the second point in time, and the 3D semantic map 730. The localization apparatus generates the 3D color map 735 corresponding to the image 720 at the second point in time by applying a color of the image 720 at the second point in time to the 3D semantic map 730 based on the final position information 725 at the second point in time. A method of generating the 3D color map 735 corresponding to the image 720 at the second point in time by applying the color of the image 720 at the second point in time to the 3D semantic map 730 will be described with reference to FIG. 8.

The 3D color map 735 corresponding to the image 720 at the second point in time may be used to generate a synthetic image 745 corresponding to the third point in time in the same manner.

The localization apparatus generates the synthetic image 745 corresponding to the third point in time based on the 3D color map 735 corresponding to the image 720 at the second point in time and position information 740 at the third point in time. The localization apparatus determines final position information 755 at the third point in time by comparing a color between the synthetic image 745 corresponding to the third point in time and an image 750 at the third point in time. The localization apparatus generates a 3D color map 765 corresponding to the image 750 at the third point in time by applying a color of the image 750 at the third point in time to the 3D semantic map 730 based on the final position information 755 at the third point in time.

Figure 8:
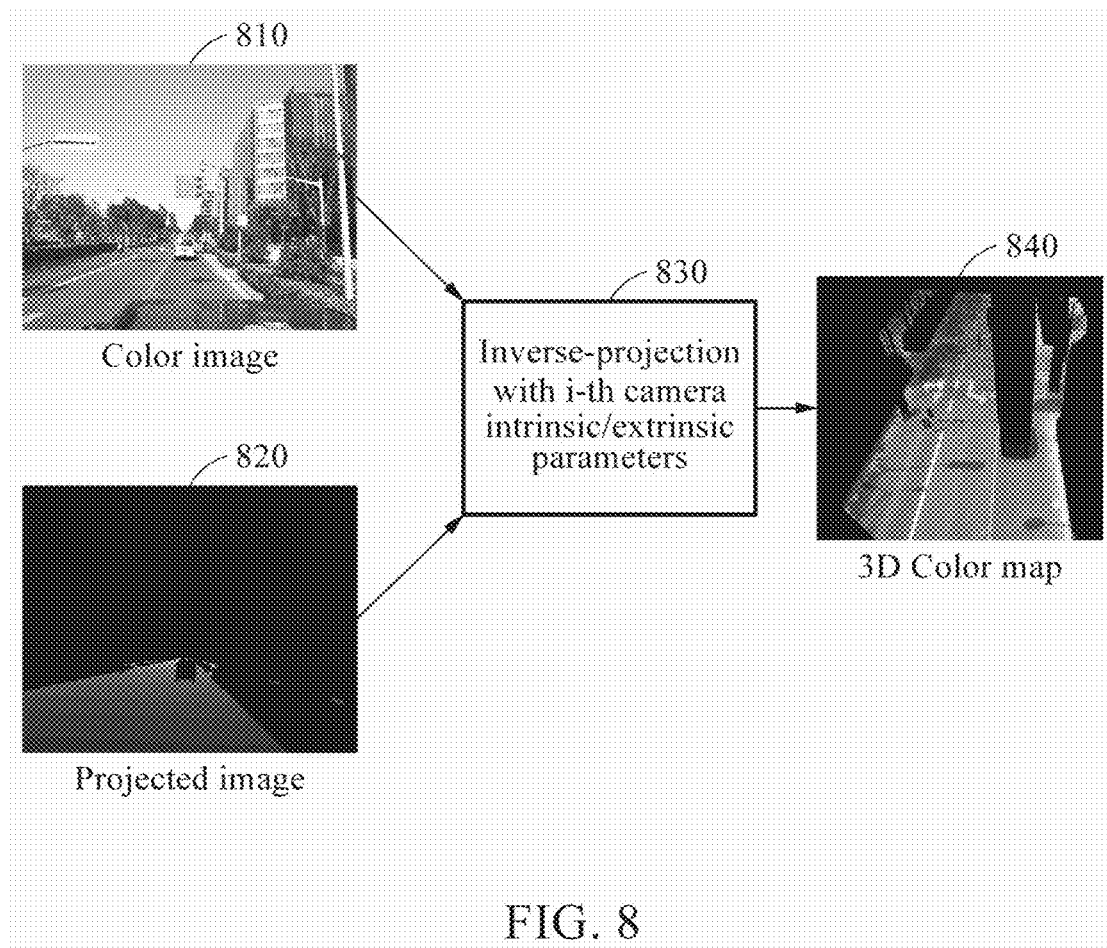
FIG. 8 illustrates an example of a color modeling process in accordance with one or more embodiments.

FIG. 8 illustrates an example of a color modeling process. FIG. 8 illustrates a color image 810, a projected image 820, and a 3D color map 840.

The color image 810 corresponds to a current frame, that is, an image at a second point in time. The projected image 820 corresponds to a projected image that is generated by projecting a 3D semantic map onto a projection surface corresponding to a geometry, for example, final position information at a second point in time, which is determined through the aforementioned localization process. The projected image 820 may be a 2D image. The localization apparatus applies a color to, that is, the localization apparatus may color the projected image 820 based on the color image 810. A method of generating, by the localization apparatus, the projected image 820 and applying a color to the projected image 820 will be further described with reference to FIG. 9.

The localization apparatus generates the 3D color map 840 corresponding to the color image 810 by inversely projecting the colored projected image onto the 3D semantic map. In an example, the localization apparatus may inversely project the colored projected image 820 onto the 3D semantic map using a parameter of a camera used to capture the image at the second point in time.

In an example, the parameter of the camera may include an intrinsic parameter and an extrinsic parameter. The intrinsic parameter may include, for example, a focal length, a principal point, and a skew coefficient. The focal length may denote a distance between a center of a lens and an image sensor. The principal point may denote a center of a camera lens, that is, image coordinates of a foot of a line from a pinhole to the image sensor. In an example, a unit may be a pixel. The skew coefficient may denote an angle at which a y axis of a cell array of the image sensor is inclined, that is, skewed.

The extrinsic parameter refers to a parameter that describes a conversation relationship between a camera coordinate system and a world coordinate system and is represented as a rotation and a translation or a transition between the two coordinate systems. The extrinsic parameter is not a unique parameter of the camera and thus, may vary depending on a position at which, and a direction in which, the camera is installed, and may also vary depending on a definition of the world coordinate system.

For example, the localization apparatus may acquire unique intrinsic parameters of the camera using a calibration tool. Additionally, the localization apparatus may acquire extrinsic parameters by performing perspective-projection of points on a 3D space onto a 2D image plane through a homography matrix or a transformation matrix based on matching pairs between 2D image coordinates and 3D world coordinates that are known or selected as a sample. The homography matrix may represent a transformation relationship established between projected corresponding points in response to projecting a first plane onto a second plane.

For example, the localization apparatus may define the homography matrix based on the parameter of the camera used to capture the color image 810. The localization apparatus generates the 3D color map 840 corresponding to the color image 810 by inversely projecting the 2D colored projected image onto the 3D semantic map using the homography matrix. The 3D color map 840 includes colored point clouds including color information and position information (x, y, z) of each pixel.

In one example, the localization apparatus may render a virtual object, for example, an indicator that guides a route, at the second point in time based on the 3D color map 840 corresponding to the color image 810. For example, when a display is a transparent display, the localization apparatus may acquire a background color displayed on the transparent display based on the 3D color map 840 corresponding to the color image 810. The localization apparatus may render the virtual object based on colors of the virtual object and the background color. The localization apparatus may render a color acquired by subtracting a background color corresponding to a position at which the virtual object is to be placed from a desired color of the virtual object.

Additionally, the localization apparatus may render a shadow component of the virtual object and an inter-reflection component by the virtual object based on the 3D color map 840 corresponding to the color image 810. For example, when the display is a general display, the localization apparatus may render a color acquired by mixing a background color and a color of the virtual object to represent a shadow and/or inter-reflection.

In addition, the localization apparatus may render a color that includes the background color to calculate an appearance of the virtual object and/or a position at which the virtual object is to be placed through background analysis. For example, the localization apparatus may change and thereby display the virtual object on a road marking or sign, or may display the virtual object on an empty space of the image. Alternatively, the localization apparatus may estimate a material, a physical characteristic, and/or an illumination environment of a road from colors of the 3D color map 840 corresponding to the color image 810.

Figure 9:
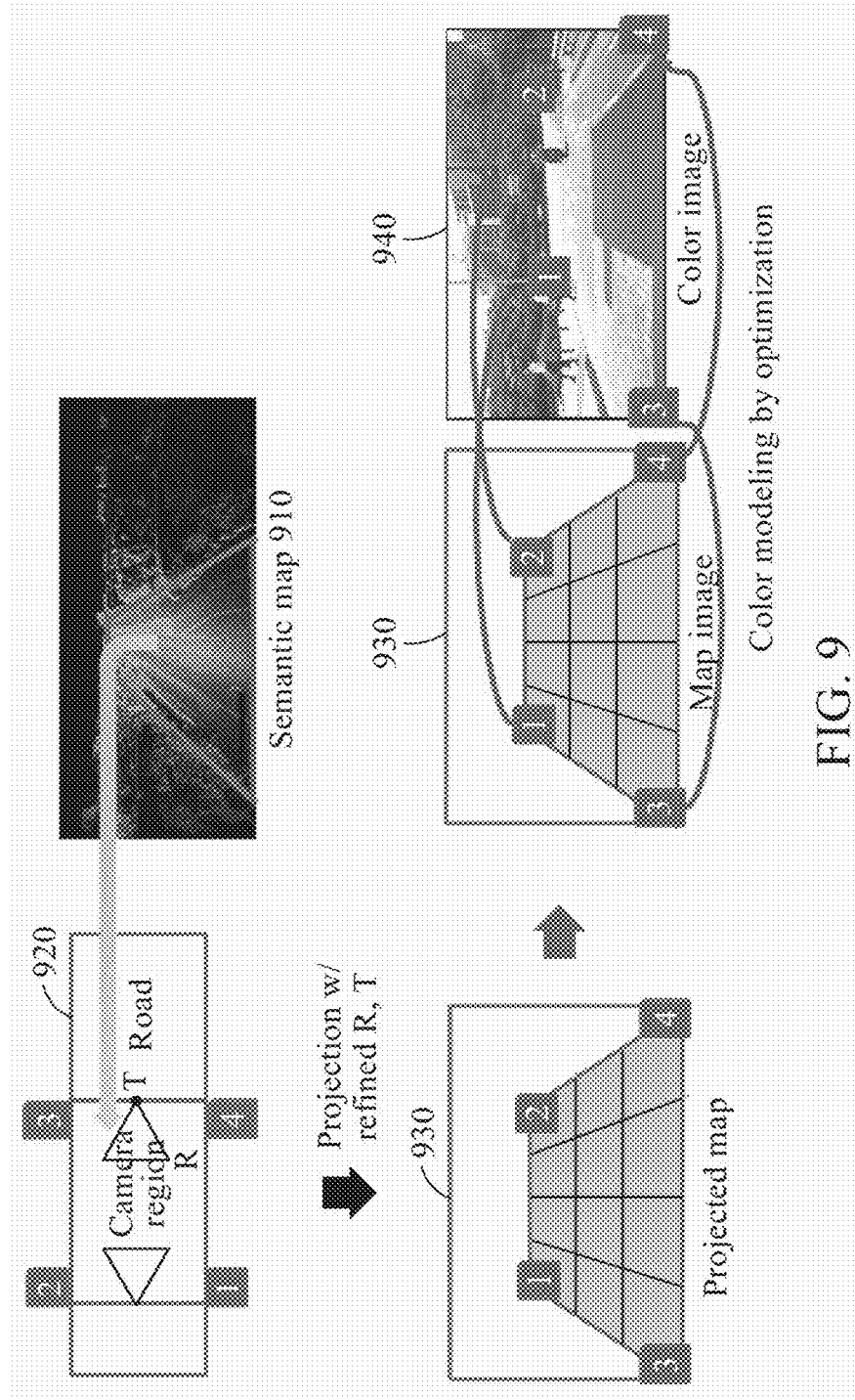
FIG. 9 illustrates an example of a process of determining a color of a 3D color map from a 3D semantic map in accordance with one or more embodiments.

FIG. 9 illustrates an example of a process of determining a color of a 3D color map from a 3D semantic map. FIG. 9 illustrates a 3D semantic map 910, a projection surface 920, a projected image 930, and a color image 940. The color image 940 corresponds to an image at a current point in time.

The localization apparatus generates the projected image 930 by projecting the 3D semantic map 910 onto the projection surface 920 corresponding to final position information (R, T) of the color image 940. In an example, the localization apparatus extracts a partial region, for example, a road region, of the 3D semantic map 910 using a parameter of a camera used to capture the color image 940. The localization apparatus generates the projected image 930 by projecting the partial region of the 3D semantic map 910 onto the 2D projection surface 920 corresponding to the final position information of the color image 940.

In an example, the localization apparatus may apply a color to, that is, the localization apparatus may color, the projected image 930 based on the color image 940. In detail, the localization apparatus may determine a color of pixels included in the projected image 930 based on a mapping relationship between the projected image 930 and the color image 940. The pixels may correspond to, for example, surface points that constitute the road surface. For example, the localization apparatus may map the projected image 930 and the color image 940 and then determine a color, for example, yellow, of a position "A" of the color image 940 as a color of a position "A" of the projected image 930. The localization apparatus may color the position "A" of the projected image 930 in a yellow color.

Depending on examples, the localization apparatus may optimize or accumulate colors of a plurality of color images instead of using a single color image 940. The localization apparatus may determine a color of the 3D color map by determining a color of the projected image 930 based on the optimized or accumulated colors. Also, the localization apparatus may reconfigure colors of the 3D color map distorted by elements such as rain or illumination, using the colors optimized or accumulated from the plurality of color images. For example, the localization apparatus may perform color modeling of the 3D color map using a stereo method of calculating a fixed stereo camera-based disparity based on a precise localization result, for example, final position information with respect to an object of which position information is absent, such as a tree and a building.

Figure 10:
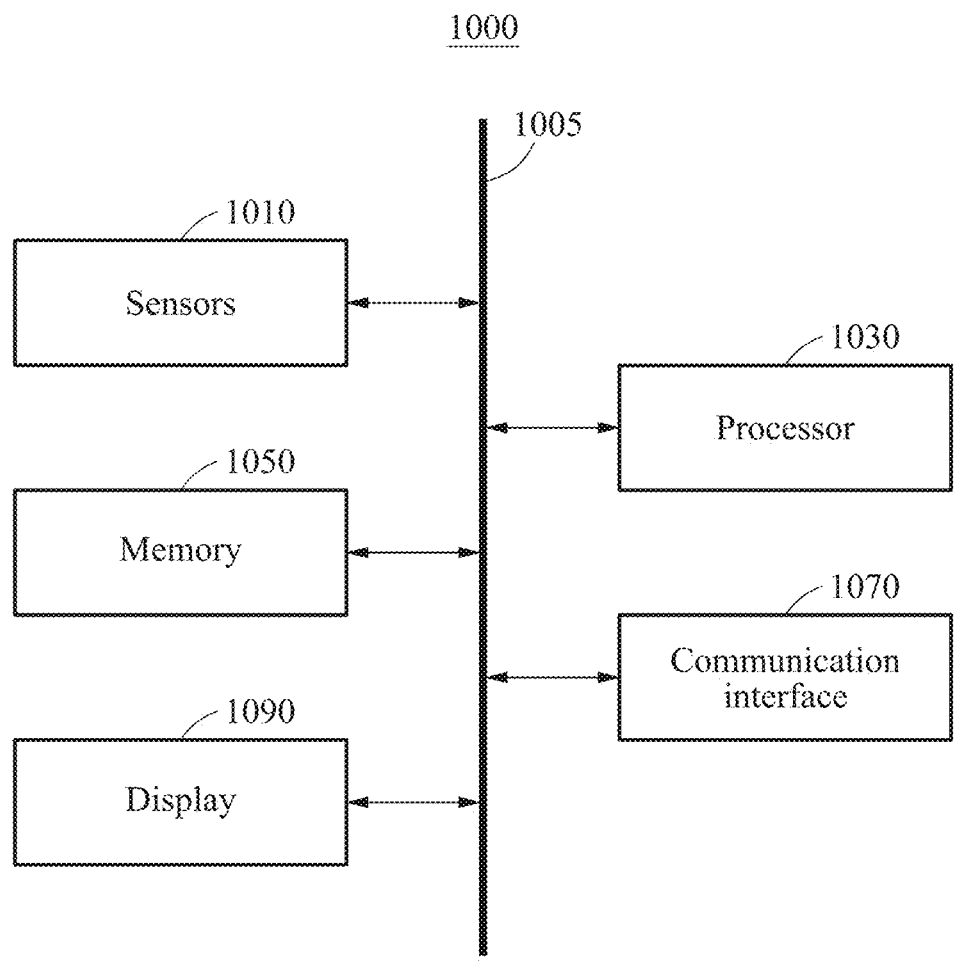
FIG. 10 illustrates an example of a localization apparatus in accordance with one or more embodiments.

FIG. 10 illustrates an example of a localization apparatus. Referring to FIG. 10, a localization apparatus 1000 may include one or more sensors 1010 and a processor 1030. The localization apparatus 1000 may further include a memory 1050, a communication interface 1070, and a display 1090. The sensors 1010, the processor 1030, the memory 1050, the communication interface 1070, and the display 1090 may communicate with each other through a communication bus 1005.

The one or more sensors 1010 may sense an image at a first point in time, sense an image at a second point in time, and sense position information at the second point in time. The one or more sensors 1010 may include, for example, an image sensor, a vision sensor, an accelerometer sensor, a gyro sensor, a GPS sensor, an IMU sensor, a RADAR, and a LIDAR, but are not limited thereto.

The one or more sensors 1010 may acquire, for example, capture, an input image that includes a driving image of a vehicle. However, the captured image is not limited thereto. The input image may correspond to a plurality of images captured at a plurality of points in times. The input image may include a single frame and may also include a plurality of frames.

The one or more sensors 1010 may sense sensing information, for example, a speed, an acceleration, a driving direction, a handle steering angle of the vehicle, a speed of the vehicle, in addition to localization information, for example, GPS coordinates, a position, and a pose of the vehicle. The one or more sensors 1010 may sense position information corresponding to an image at each point in time.

The processor 1030 may generate a synthetic image corresponding to the second point in time based on a 3D color map corresponding to the image at the first point in time and position information at the second point in time. The processor 1030 may determine final position information at the second point in time based on the synthetic image corresponding to the second point in time and the image at the second point in time.

The processor 1030 may generate the synthetic image by projecting the 3D color map corresponding to the real image at the first point in time onto a 3D semantic map based on the position information at the second point in time.

The processor 1030 may calculate relative pose information based on the synthetic image corresponding to the second point in time and the real image at the second point in time. The processor 1030 may determine final position information at the second point in time corresponding to the real image at the second point in time based on the relative pose information.

The processor 1030 may generate the 3D color map corresponding to the image at the second point in time based on the real image at the second point in time, the final position information at the second point in time, and a geometry acquired from the 3D semantic map.

The processor 1030 may generate a projected image by projecting the 3D semantic map onto a projection surface corresponding to the final position information at the second point in time. The processor 1030 may color the projected image based on the image at the second point in time. The processor 1030 may generate the 3D color map corresponding to the real image at the second point in time by inversely projecting the colored projected image onto the 3D semantic map.

In an example, the processor 1030 renders a virtual object at the second point in time using the 3D color map corresponding to the real image at the second point in time.

The memory 1050 may store position information and an image at each point in time sensed by the one or more sensors 1010. Additionally, the memory 1050 may store the 3D color map and/or the synthetic image corresponding to the real image at each point in time generated by the processor 1030. For example, the 3D color map may use a large memory capacity. In this case, the memory 1050 may delete the 3D color map sequentially and/or at a time after a desired period of time is elapsed.

The memory 1050 may store a variety of information generated during the aforementioned processing process of the processor 1030. In addition, the memory 1050 may store a variety of data and programs. The memory 1050 may include a volatile memory or a non-volatile memory. The memory 1050 may store a variety of data by including a mass storage medium, such as, a hard disc.

The communication interface 1070 may receive a variety of sensing information that includes an image at each point in time and position information corresponding to the image at each point in time from other sensors present outside the localization apparatus 1000. The communication interface 1070 may output the 3D color map and/or the synthetic image generated by the processor 1030 to a source external to the localization apparatus 1000. Also, the communication interface 1070 may output final position information corresponding to the image at each point in time determined by the processor 1030.

The display 1090 may display the image that is rendered based on the final position information corresponding to the image at each point in time determined by the processor 1030. Also, the display 1090 may provide an AR service by displaying a result of rendering, by the processor 1030, the virtual object at the second point in time using the 3D color map corresponding to the image at the second point in time.

Also, the processor 1030 may perform any one, any combination, or all operations of the methods described with reference to FIGS. 1 to 9 or an algorithm corresponding thereto. The processor 1030 refers to a data processing device configured as hardware having a circuitry in a physical structure to perform desired operations. For example, the desired operations may include codes or instructions included in a program. For example, the data processing device configured as hardware may include a microprocessor, a central processing unit (CPU), a processor core, a multi-core processor, a multiprocessor, a multiprocessor, an application-specific integrated circuit (ASIC), and a field programmable gate array (FPGA).

The processor 1030 executes the program and controls the localization apparatus 1000. The program code executed by the processor 1030 may be stored in the memory 1050.

The localization apparatus 1000 provides natural AR rendering through, for example, a HUD or AR glasses.

The localization apparatus 100, camera 101/415/435, GPS/IMU 103/310/410/425, encoder network 633, decoder network 636, one or more sensors 1010, processor 1030, memory 1050, display interface 1090, and other apparatuses, described herein with respect to FIGS. 1-10 are, and are implemented by, hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated herein and discussed with respect to FIGS. 1-10, and that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computers using an interpreter. The instructions or software may be written using any programming language based on the block diagrams and the flow charts illustrated in the drawings and the corresponding descriptions in the specification, which disclose algorithms for performing the operations may be performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory ROM), random-access programmable read only memory PROM), electrically erasable programmable read-only memory EEPROM), random-access memory RAM), dynamic random access memory DRAM), static random access memory SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, as non-limiting blue-ray or optical disk storage examples, hard disk drive HDD), solid state drive SSD), flash memory, a card type memory such as multimedia card micro or a card for example, secure digital SD) or extreme digital XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A localization method comprising:
generating a synthetic image corresponding to a current time period based on a three-dimensional (3D) color map corresponding to an image captured at a time period prior to the current time period, and position information at the current time period by projecting the 3D color map onto a 3D semantic map; and
determining final position information at the current time period based on the synthetic image corresponding to the current time period and an image captured at the current time period.

2. The localization method of claim 1, wherein the generating of the synthetic image comprises generating the synthetic image by projecting the 3D color map corresponding to the image at the prior time period onto the 3D semantic map based on the position information at the current time period.

3. The localization method of claim 1, wherein the determining of the final position comprises:
calculating relative pose information based on the synthetic image corresponding to the current time period and the image captured at the current time period; and
determining the final position information at the current time period based on the relative pose information.

4. The localization method of claim 3, wherein the calculating of the relative pose position comprises:
matching the synthetic image corresponding to the current time period and the image captured at the current time period;
comparing first pose information in the synthetic image corresponding to the current time period to second pose information in the image captured at the current time period; and
calculating the relative pose information based on a comparison result.

5. The localization method of claim 4, wherein the comparing of the first pose information comprises at least one of:
comparing a color of the synthetic image corresponding to the current time period to a color of the image captured at the current time period;
comparing semantic information of the synthetic image corresponding to the current time period to semantic information of the image captured at the current time period; and
comparing depth information of the synthetic image corresponding to the current time period to depth information of the image captured at the current time period.

6. The localization method of claim 3, wherein the determining of the final position information comprises determining the final position information at the current time period by modifying the position information at the current time period based on the relative pose information.

7. The localization method of claim 1, further comprising:
generating a 3D color map corresponding to the image captured at the current time period based on the image at the current time period, the final position information at the current time period, and a 3D geometry acquired from the 3D semantic map.

8. The localization method of claim 7, wherein the generating of the 3D color map comprises generating the 3D color map corresponding to the image captured at the current time period such that a color difference between the image captured at the current time period and the synthetic image corresponding to the current time period is within a desired standard based on the final position information at the current time period.

9. The localization method of claim 7, wherein the generating of the 3D color map comprises:
generating a projected image by projecting the 3D semantic map onto a projection surface corresponding to the final position information at the current time period;
coloring the projected image based on the image captured at the current time period; and
generating the 3D color map corresponding to the image captured at the current time period by inversely projecting the colored projected image onto the 3D semantic map.

10. The localization method of claim 9, wherein the generating of the projected image comprises:
extracting a partial region of the 3D semantic map based on a parameter of a camera that captures the image at the current time period; and
projecting the partial region onto the projection surface.

11. The localization method of claim 9, wherein the coloring of the projected image comprises:
determining a color of pixels included in the projected image based on a mapping relationship between the projected image and the image captured at the current time period.

12. The localization method of claim 11, wherein the pixels correspond to surface points corresponding to a surface of a road.

13. The localization method of claim 7, further comprising:
rendering a virtual object at the current time period with the 3D color map corresponding to the image captured at the current time period.

14. The localization method of claim 13, wherein the rendering of the virtual object comprises:
acquiring a background color displayed on a transparent display based on the 3D color map corresponding to the image captured at the current time period; and
rendering the virtual object based on a color of the virtual object and the background color.

15. The localization method of claim 13, wherein the rendering of the virtual object comprises rendering a shadow component of the virtual object and an inter-reflected component by the virtual object with the 3D color map corresponding to the image captured at the current time period.

16. A non-transitory computer-readable storage medium storing instructions that, when executed by a processor, cause the processor to perform the localization method of claim 1.

17. A localization apparatus comprising:
one or more sensors configured to capture an image at a first time period and position information at a second time period; and
a processor configured to:
generate a synthetic image corresponding to the second time period based on a three-dimensional (3D) color map corresponding to the image captured at the first time period and the position information at the second time period by projecting the 3D color mat onto a 3D semantic map, and
determine final position information at the second time period based on the synthetic image corresponding to the second time period and the image at the second time period.

18. The localization apparatus of claim 17, wherein the processor is configured to generate the synthetic image by projecting the 3D color map corresponding to the image captured at the first time period onto the 3D semantic map based on the position information at the second time period.

19. The localization apparatus of claim 17, wherein the processor is configured to calculate relative pose information based on the synthetic image corresponding to the second time period and the image captured at the second time period, and to determine the final position information at the second time period based on the relative pose information.

20. The localization apparatus of claim 17, wherein the processor is configured to generate a 3D color map corresponding to the image captured at the second time period based on the image captured at the second time period, the final position information at the second time period, and a 3D geometry acquired from the 3D semantic map.

21. The localization apparatus of claim 20, wherein the processor is configured to generate a projected image by projecting the 3D semantic map onto a projection surface corresponding to the final position information at the second time period, to color the projected image based on the image at the second time period, and to generate the 3D color map corresponding to the image at the second time period by inversely projecting the colored projected image onto the 3D semantic map.

22. A localization method comprising:
receiving a current image frame and position information related to the current image frame;
generating a synthetic image corresponding to the current image frame based on the position information and a three-dimensional (3D) color map corresponding to a previous image frame by projecting the 3D color map onto a 3D semantic map; and
determining a final position of a current image of the current image frame based on a pose difference between the synthetic image and the current image.

23. The method of claim 22, wherein the pose difference corresponds to a difference between first pose information in the synthetic image corresponding to the current image frame, and second pose information in the current image frame.

* * * * *